(12) United States Patent
Cheikh et al.

(10) Patent No.: US 12,198,563 B2
(45) Date of Patent: Jan. 14, 2025

(54) SYSTEM AND METHOD FOR INSTRUCTING ONE OR MORE WEATHER DRONES

(71) Applicant: SITA Information Networking Computing UK Limited, Middlesex (GB)

(72) Inventors: Stephane Cheikh, Middlesex (GB); Thierry Le Gall, Middlesex (GB)

(73) Assignee: SITA Information Networking Computing UK Limited (GB)

( * ) Notice: Subject to any disclaimer, the term of this patent is extended or adjusted under 35 U.S.C. 154(b) by 268 days.

(21) Appl. No.: 17/776,442

(22) PCT Filed: Dec. 23, 2020

(86) PCT No.: PCT/GB2020/053358
§ 371 (c)(1),
(2) Date: May 12, 2022

(87) PCT Pub. No.: WO2021/130493
PCT Pub. Date: Jul. 1, 2021

(65) Prior Publication Data
US 2023/0139171 A1    May 4, 2023

(30) Foreign Application Priority Data

Dec. 23, 2019 (GB) ..................... 1919247

(51) Int. Cl.
*G08G 5/00*      (2006.01)
*G01W 1/08*      (2006.01)

(52) U.S. Cl.
CPC ............ *G08G 5/0091* (2013.01); *G01W 1/08* (2013.01); *G08G 5/0013* (2013.01);
(Continued)

(58) Field of Classification Search
CPC .. G08G 5/0091; G08G 5/0013; G08G 5/0039; G08G 5/0043; G08G 5/006; G08G 5/0069; G01W 1/08
See application file for complete search history.

(56) References Cited

U.S. PATENT DOCUMENTS

| 8,505,847 B2 * | 8/2013 | Ciampa ................. B64C 39/024 244/30 |
| 9,334,052 B2 | 5/2016 | Pasko et al. |

(Continued)

FOREIGN PATENT DOCUMENTS

| JP | 2018112485 A * | 7/2018 | ............. G01W 1/08 |
| KR | 101602171 B1 | 3/2016 | |

(Continued)

OTHER PUBLICATIONS

Section of AAA regulations 7110.1000, screen capture of part of faa.gov/air-traffic/publications/atpubs/fs_html/appendix_a.html (Year: 2024).*

(Continued)

*Primary Examiner* — Peter D Nolan
*Assistant Examiner* — Tanya C Sienko
(74) *Attorney, Agent, or Firm* — Morris, Manning & Martin, LLP; Daniel E. Sineway, Esq.; Adam J. Thompson, Esq.

(57) ABSTRACT

A computer implemented method and system of instructing one or more weather drones. The method includes analysing a first data set comprising flight path data indicative of the flight paths of one or more aircrafts over a predefined time period. The method includes identifying, based on said analysis, at least one geographical region which is not intercepted by or adjacent to, any of the flight paths of the (Continued)

Figure 1:
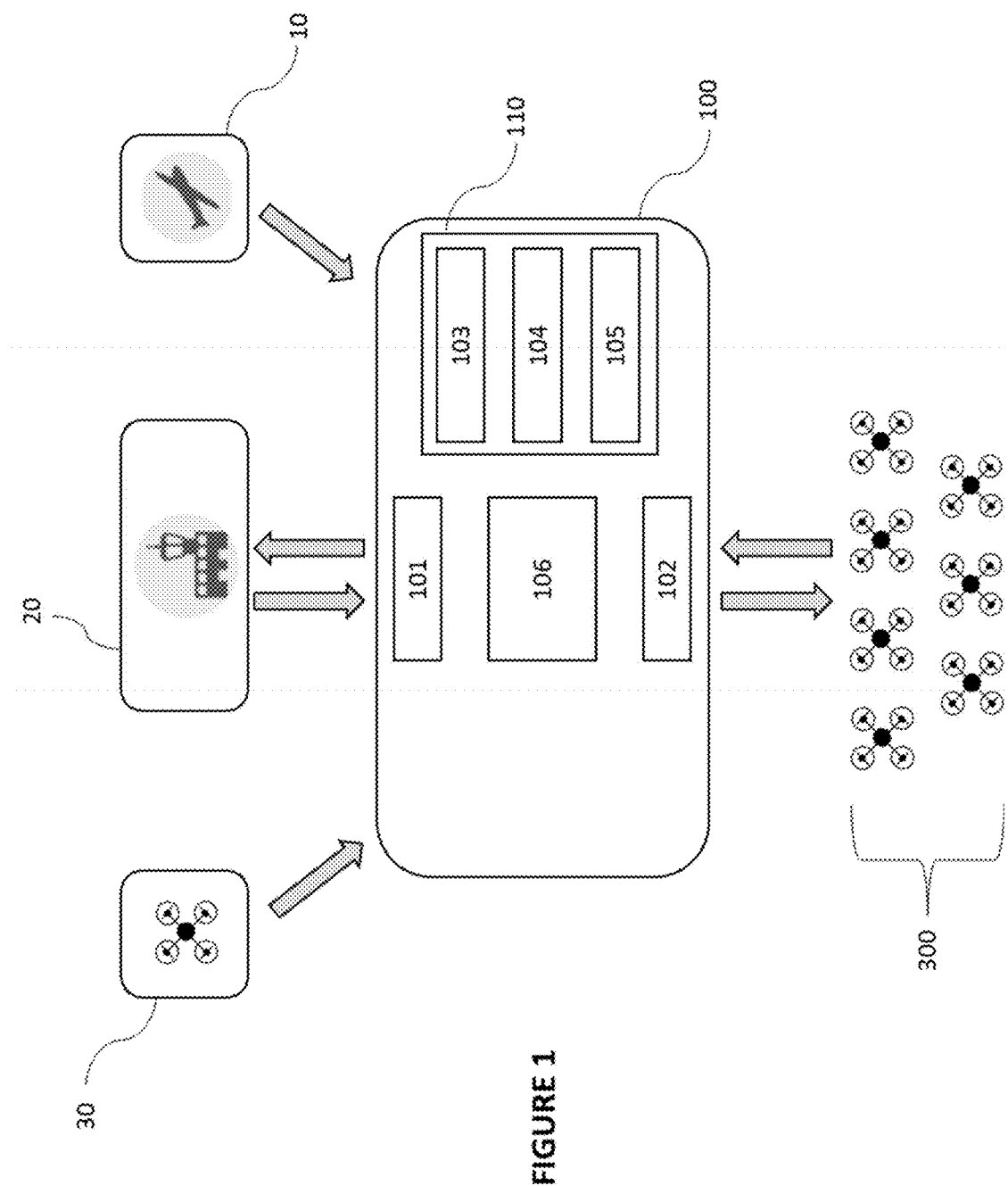

one or more aircrafts. The method includes instructing one or more weather drones to fly to the at least one geographical region.

12 Claims, 2 Drawing Sheets

(52) U.S. Cl.
CPC ......... *G08G 5/0039* (2013.01); *G08G 5/0043* (2013.01); *G08G 5/006* (2013.01); *G08G 5/0069* (2013.01)

(56) References Cited

U.S. PATENT DOCUMENTS

| | | | |
|---|---|---|---|
| 9,696,458 | B2 | 7/2017 | Fengler |
| 9,864,372 | B2 | 1/2018 | Chen et al. |
| 2014/0249738 | A1* | 9/2014 | Euteneuer .......... B62D 15/0265 701/301 |
| 2016/0327959 | A1 | 11/2016 | Brown et al. |
| 2017/0090069 | A1 | 3/2017 | Kirby |
| 2018/0018884 | A1 | 1/2018 | Giusti et al. |
| 2018/0102057 | A1 | 4/2018 | Lo et al. |

FOREIGN PATENT DOCUMENTS

| | | | | |
|---|---|---|---|---|
| KR | 20180031298 A | | 3/2018 | |
| WO | WO-2016105523 A1 | * | 6/2016 | ............... B64B 1/40 |
| WO | 2017100579 A1 | | 6/2017 | |
| WO | WO-2017120618 A1 | * | 7/2017 | |
| WO | WO-2017173159 A1 | * | 10/2017 | ............... B60F 5/02 |
| WO | 2021130493 A1 | | 7/2021 | |

OTHER PUBLICATIONS

"FAA Flight Plans" by Olha, Sep. 23, 2013, downloaded from RocketRoute (Year: 2013).*

"Multi-drone Control with Autonomous Mission Support" by N. Paula et al., 2019 IEEE International Conference on Pervasive Computing and Communications Workshops (2019, pp. 918-923) electronic publication date Jun. 4, 2019 (Year: 2019).*

Machine translation of JP2018112485A downloaded from IP.com May 21, 2024 (Year: 2024).*

Combined Search Report and Examination Report issued in GB Application No. 1919247.5, dated Jun. 18, 2020.

International Search Report & Written Opinion, issued in International Patent Application No. PCT/GB2020/053358, mailed Apr. 1, 2021 (date of completion: Mar. 22, 2021); 11 pages.

International Preliminary Report on Patentability for International Application No. PCT/GB2020/053358, mailed Jul. 7, 2022, 9 Pages.

* cited by examiner

SYSTEM AND METHOD FOR INSTRUCTING ONE OR MORE WEATHER DRONES

CROSS REFERENCE TO RELATED APPLICATIONS

This application is a national phase application of, and claims benefit of and priority to International Application No. PCT/GB2020/053358, filed Dec. 23, 2020, entitled "SYSTEM AND METHOD FOR INSTRUCTING ONE OR MORE WEATHER DRONES," which claims priority to Great Britain Application No. 1919247.5, filed Dec. 23, 2019, entitled "SYSTEM AND METHOD FOR INSTRUCTING ONE OR MORE WEATHER DRONES," the disclosures of which are herein incorporated by reference as if set forth herein in their entireties.

FIELD OF THE INVENTION

This invention relates to a system and method for instructing one or more weather drones.

BACKGROUND TO THE INVENTION

The measurement and analysis of weather data is becoming increasingly important for a number of different commercial and civil operations. Historically, weather data has been measured and analysed by national or regional Meteorological Offices, through a range of ground based facilities. Such measurements can be further supplemented through the likes of satellite facilities, as well as weather balloons, to obtain a more comprehensive pool of weather data.

More recently, a significant amount of weather data has been collected through the Global Aircraft Meteorological DAta Relay (AMDAR) programme, which has been initiated by the World Meteorological Organization (WMO) and its Members, in cooperation with aviation partners. The AMDAR system utilises predominantly existing aircraft on-board sensors, computers and communications systems to collect, process, format and transmit meteorological data to ground stations via satellite or radio links. Once on the ground, the data is relayed to National Meteorological and Hydrological Services, where it is processed, quality controlled and transmitted on the WMO Global Telecommunications System (GTS). The WMO global AMDAR system has produced over 700,000 high-quality observations per day of air temperature and wind speed and direction, together with the required positional and temporal information and with an increasing number of humidity and turbulence measurements being made.

Although systems/programmes like AMDAR have made a significant contribution to the technical field of weather monitoring, they do have drawbacks and limitations. For example, the systems are only able to source weather data from aircraft which are fitted with the appropriate on-board sensors, computers and communications systems. Such systems are also only about to source weather data from aircraft belonging to airlines, which have enrolled in the programme. Furthermore, such systems are also restricted to only sourcing weather data from regions in which their associated aircraft fly.

It would therefore be desirable to improve the amount of weather data that can be collected from systems and programmes such as AMDAR. It would also be desirable to obtain a more comprehensive and/or customisable weather data set, which is collected by such systems and programmes.

The invention is defined in the independent claims, to which reference should be made. Preferred features are set out in the dependent claims.

According to a first aspect of the invention, there is provided a computer implemented method of instructing one or more weather drones. The method comprises the steps of: analysing at least a first set of data, said data comprising flight path data indicative of the flight path of one or more aircrafts over a predefined time period; identifying, based on said analysis, at least one geographical region which is not intercepted by or adjacent to, any of the flight paths of the one or more aircrafts; and instructing one or more weather drones to fly to the at least one geographical region.

The step of instructing the one or more weather drones to fly to the at least one geographical region may be implemented by sending an instruction to the one or more weather drones, wherein the instruction is configured to instruct the one or more weather drones to fly to the at least one geographical region and instruct the one or more weather drones to collect weather data in the at least one geographical region.

By providing a method in accordance with the first aspect of the present invention, a specific geographical region can be identified and one or more weather drones can be specifically instructed to fly to said region to collect weather data in said region. The geographical region of interest is identified by analysing at least one data set, which comprises flight path data indicative of the flight path of one or more aircrafts within a predefined time period. In particular, the analysis can identify regions where aircraft are not expected to pass through, or have not passed through, and therefore identify regions where systems like AMDAR would not have otherwise collected data from. The weather data collected by the one or more weather drones may then be used to supplement the weather data collected by the aircraft of the AMDAR system and thereby provide a more comprehensive and/or customisable weather data set. Such data sets may help to improve the effectiveness of weather prediction models.

The present invention also relates to a system configured to execute the method of the first aspect of the present invention. Therefore, according to a second aspect of the present invention, there is provided a system for instructing one or more weather drones. The system comprises: an analysing module configured to analyse at least a first set of data, said data comprising flight path data indicative of the flight path of one or more aircrafts within a predefined time period; and identifying module configured to identify, based on said analysis, at least one geographical region which is not intercepted by or adjacent to, any of the flight paths of the one or more aircrafts; and an instructing module configured to instruct one or more weather drones to fly to the at least one geographical region.

It will be appreciated that the system of the second aspect of the invention may comprise one or more modules configured to implement one or more steps of the computer implemented method of the first aspect of the invention. Where features are described below in respect of a computer implemented method step, it will be appreciated that said disclosure also extends to a corresponding module of the system of the second aspect of the invention. Likewise, where features are described below in respect of a system, it will be appreciated that said disclosure also extends to a corresponding step of the computer implemented method of the first aspect of the invention.

The system may be configured to directly instruct one or more weather drones to fly to the at least one geographical region. For example, the system may be configured to establish a communications link with one or more drones and send an instruction command to the one or more drones via the communications link.

Alternatively or additionally, the system may be configured to issue a recommendation for the one or more drones to fly to the at least one geographical region. For example, the recommendation may be a message which is sent to an operator of the system. The operator of the system can then choose to directly or indirectly instruct the one or more drones to fly to the at least one geographical region.

In some embodiments, the one or more weather drones may remain in the at least one geographical region for a given time period after flying to the at least one geographical region to collect weather data. The one or more weather drones may remain in the at least one geographical region for a predetermined time period. The one or more weather drones may collect weather data for some or all of this predetermined time period. The predetermined time period may be specified as part of the instruction which instructs the one or more weather drones to fly to the at least one geographical region.

In some embodiments, the one or more weather drones may maintain flight within the at least one geographical region at a constant altitude and/or constant location, for example a constant longitude and latitude, whilst collecting weather data. The one or more weather drones may remain stationary whilst collecting weather data in the at least one geographical region.

In some embodiments, the one or more weather drones may remain in the at least one geographical region until receiving an instruction to return to base. Alternatively or additionally, the one or more weather drones may return to base from the at least one geographical region after a predetermined amount of time has elapsed. The one or more weather drones may collect weather data for some or all of this predetermined amount of time before returning to base. Alternatively or additionally, the one or more weather drones may return to base automatically due to detection of a low power status and/or limited remaining fuel.

It will be appreciated that the term 'drone' is used herein to refer to any unmanned aerial vehicle (UAV). A 'UAV' will be understood to mean to any powered, aerial vehicle that does not carry a human operator, uses aerodynamic forces to provide vehicle lift, can fly autonomously or be piloted remotely, and can be expendable or recoverable. The UAV may be powered by an on-board fuel source, such as a combustible fuel and/or an electric battery. Alternatively or additionally, the UAV may be powered by one or more solar cells carried by the UAV. The term 'weather drone' refers to any drone or UAV configured to measure one or more parameters indicative of weather.

Each drone may comprise a network module configured to enable wireless communications between the drone and the system of the invention. The wireless communication may enable the transfer of instructions from the system to each drone. The wireless communication may enable the transfer of weather data from each drone to the system or to another entity, such as a weather station. Where a plurality of drones are provided, the drones may be configured to form a mesh network for communication with one another.

Each drone may comprise at least one sensor configured to measure one or more parameters indicative of weather. Examples of such sensors include humidity sensors, solar sensors, wind speed sensors, temperature sensors and pressure sensors. Each drone may comprise an on-board memory. The on-board memory may be configured to store weather data measured by the at least one sensor.

The system may comprise one or more of a departure control system and an air traffic control system. Alternatively or additionally, the system may be in communication with one or more of a departure control system and an air traffic control system. The system may be configured to source the flight path data of the first data set from one or both of the departure control system and the air traffic control system.

The first data set comprises flight path data indicative of the flight path of one or more aircrafts over a predefined time period. The predefined time period may be a predefined period of time in the past. For example, when the system analyses the first data set, the system may be configured to analyse one or more recorded flight paths, which have occurred in the past 24 hours. In such embodiments, the system may identify a lack of flights through or near to one or more geographical regions in the past 24 hours. The system may be configured to compare any such identified regions with a weather database, such as a of a national or regional Meteorological Office, to determine if there is a need for obtaining further weather data for such identified regions. For example, if the national or regional Meteorological Office have not collected weather data from such identified regions in the past 24 hours then the system may determine that there is a need for obtaining further weather data for such identified regions. After such a determination, the system may be configured to instruct one or more weather drones to fly to the identified regions. It will be appreciated that 24 hours has been selected as an indicative example of a predefined period in the above discussion and that other predefined periods are also contemplated.

Alternatively or additionally, the predefined time period may be a predefined period of time in the future. For example, when the system analyses the first data set, the system may be configured to analyse one or more predicted flight paths, which are scheduled to occur in the next 24 hours. In such embodiments, the system may identify a lack of flights through or near to one or more geographical regions in the next 24 hours. The system may be configured to compare any such identified regions with a weather database, such as a database of a national or regional Meteorological Office, to determine if there is a need for obtaining further weather data for such identified regions. For example, if the national or regional Meteorological Office is not expecting to collect weather data from such identified regions in the next 24 hours then the system may determine that there is a need for obtaining further weather data for such identified regions. After such a determination, the system may be configured to instruct one or more weather drones to fly to the identified regions. It will be appreciated that 24 hours has been selected as an indicative example of a predefined period in the above discussion and that other predefined periods are also contemplated.

The first data set may comprise data indicative of the time of year of the flight paths of the one or aircrafts. The system may be configured to analyse this data and issue the instructions to the one or more drones based on said analysis. For example, if more extreme weather events are more likely to occur during certain months, the system may be configured to increase the number of drones instructed to fly to a geographical region, if it is determined that the first data set indicates that the flight path is occurring in said month or months.

The first data set may comprise data indicative of the type of aircraft taking each flight path, and/or the type of sensors carried by the aircraft taking each flight path. In such embodiments, the system may be configured to filter out the flight path data for only the flights of aircraft equipped with weather data sensors, and in particular, aircraft equipped with AMDAR sensors.

The system may be configured to analyse further data sets in addition to the first data set. For example, the system may be configured to analyse a second data set, said second data set comprising data indicating the location of one or more non-aircraft weather data capturing resources. The system may be configured to identify, based on said analysis, at least one geographical region which is not intercepted by or adjacent to any of the flight paths of the one or more aircrafts, and which is also not in the same region as or adjacent to the location of the one or more non-aircraft weather data capturing resources. In this way, the one or more drones are not sent to a location where weather data is already being captured. In this way, a weather drone is prevented from recording redundant weather data. This also enables the weather drone to be available for use in collecting weather data in another geographical region.

The non-aircraft weather data capturing resources may include one or more fixed weather data capturing resources, such as one or more weather stations. The weather stations may belong to a national weather monitoring organisation. The non-aircraft weather data capturing resources may include one or more weather balloons.

The system may be further configured to analyse drone data. The drone data may comprise data indicating the location of two or more drones. After analysing the drone data, the system may be configured to determine which drone or drones are most suitable for being instructed to fly to the at least one geographical region. Such determination may involve one or more of: analysing which drone or drones are closest to the at least one geographical region, analysing the fuel capacity or time in air capacity of each drone, and analysing whether any of the drones are currently in use. A drone may be considered to be currently in use if it has already been allocated instructions for flying to a geographical region to collect weather data.

The system of the present invention may be configured to instruct the positioning of weather drones based on a predicted flight path scheme. That is, the system may be configured to analyse a schedule of flights for a given period of time (such as an upcoming 24 hour period), and instruct the positioning of weather drones based on this analysis. However, the present inventors have appreciated that an aircraft's flight path may change during its journey. The change may occur because of one or more of disruptive weather, landing delays, re-routing of other aircrafts flight paths, and passenger emergencies. The present inventors have also appreciated that such changes could impact the desired positioning of the one or more weather drones. Consequently, embodiments and aspects of the invention may be configured to react to such flight path changes and instruct the positioning of weather drones accordingly.

Therefore, preferably, the first and second aspects of the invention include monitoring for updates to the flight path data; identifying that a change has occurred in the flight path data; and instructing the positioning of one or more weather drones based on the identified change. Such dynamic adjustment of the positioning of the one or more weather drones can allow for a more comprehensive and effective weather data set to be collected in an efficient way.

For example, in some embodiments, the system of the first aspect of the invention analyses a predicted flight path scheme for a plurality of flights, and determines that a first geographical region will not be intercepted by or adjacent to any of the scheduled flights paths. The system then instructs a first weather drone to fly to the first geographical region to collect weather data. However, subsequent to this instruction, one of the flight paths in the scheme is changed such that an aircraft is now due to fly through the first geographical region. Since this aircraft is enrolled in the AMDAR programme, there is now no longer a need for deployment of the first weather drone to the first geographical region. In such circumstances, the system may be configured to send a further instruction to the first weather drone, which instructs the first weather drone to no longer fly to the first geographical region. The further instruction may also instruct the first weather drone to return to base, or to fly to another designated geographical region. In this way, the first weather drone is prevented from recording redundant weather data. This also enables the first weather drone to be available for use in collecting weather data in another geographical region.

The present invention also contemplates dynamic adjustment of the positioning of the one or more weather drones to compensate for potential loss of weather data due to a change in an aircraft's flight path.

Therefore, according to a third aspect of the present invention, there is provided a computer implemented method of instructing one or more weather drones, the method comprising the steps of: analysing a first data set comprising flight path data indicative of the flight paths of one or more aircrafts over a predefined time period; monitoring for updates to the flight path data; determining that a change has occurred in the flight path data, such that one of the flight paths no longer passes through or adjacent to a given geographical region; and instructing one or more weather drones to fly to the given geographical region.

By providing a method in accordance with the third aspect of the present invention, it is possible to improve the comprehensiveness of weather data collected and shared within weather monitoring systems, such as AMDAR. In particular, with the method of the third aspect of the invention it is possible to identify a gap that will be created in a weather data set by virtue of an aircraft's flight path being changed, and then deploy one or more weather drones in a way that fills said gap. More specifically, if an aircraft was expected to take a certain flight path and measure weather data along its route, there may be a certain expectation of receiving weather data from one or more regions along that route. This expectation may lead to decisions on non-use or non-deployment of other weather monitoring assets in or near to said one or more regions along the aircrafts route. However, with the method of the third aspect of the invention, it is possible to still deliver on this expectation, by dispatching one or more drones to collect the expected weather data.

The present invention also relates to a system configured to execute the method of the third aspect of the present invention. Therefore, according to a fourth aspect of the present invention, there is provided a system for instructing one or more weather drones. The system comprises: an analysing module configured to analyse at least a first set of data, said data comprising flight path data indicative of the flight path of one or more aircrafts within a predefined time period; a monitoring module configured to monitor for updates to the flight path data; a determining module configured to determine that a change has occurred in the flight path data, such that one of the flight paths no longer passes through a given geographical region; and an instructing module configured to instruct one or more weather drones to fly to the given geographical region.

It will be appreciated that the system of the fourth aspect of the invention may comprise one or more modules configured to implement one or more steps of the computer implemented method of the third aspect of the invention. Where features are described herein in respect of a computer implemented method step, it will be appreciated that said disclosure also extends to a corresponding module of the system of the fourth aspect of the invention. Likewise, where features are described herein in respect of a system, it will be appreciated that said disclosure also extends to a corresponding step of the computer implemented method of the third aspect of the invention.

As noted above, in embodiments of the present invention, a system may be configured to monitor for changes to a flight path and make a determination as to whether or not to instruct the positioning of a weather drone based on the change in the flight path. In such embodiments, the system may be configured to only make a determination about the drone positioning if the change in the flight path exceeds a threshold value. More specifically, the system may be configured to only instruct positioning or re-positioning of a drone, if the flight path changes by more than a predefined amount. The predefined amount may be a distance in kilometres. The distance in kilometres may be measured by comparing points on the previous flight path with corresponding points on the new flight path. Such embodiments may advantageously avoid unnecessarily deploying a weather drone where an aircraft's flight path has only changed by a small amount. In such scenarios the re-routed aircraft may still be capable of delivering adequate weather data on its new minimally re-routed flight path.

As will be appreciated from the above, the present invention concerns a system and method for determining when to instruct one or more weather drones to fly to at least one geographical region. The geographical region is a three dimensional region, defined by longitude, latitude and altitude parameters. The geographical region may be a single point in space, defined by a single value for each of longitude, latitude and altitude. Alternatively, the geographical region may be a spatial region, defined by a set of longitude, latitude and altitude parameters.

It will be appreciated that preferred features described above in relation to the first and second aspects of the invention may also be applicable to the third and fourth aspects of the invention, and vice versa.

Figure 2:
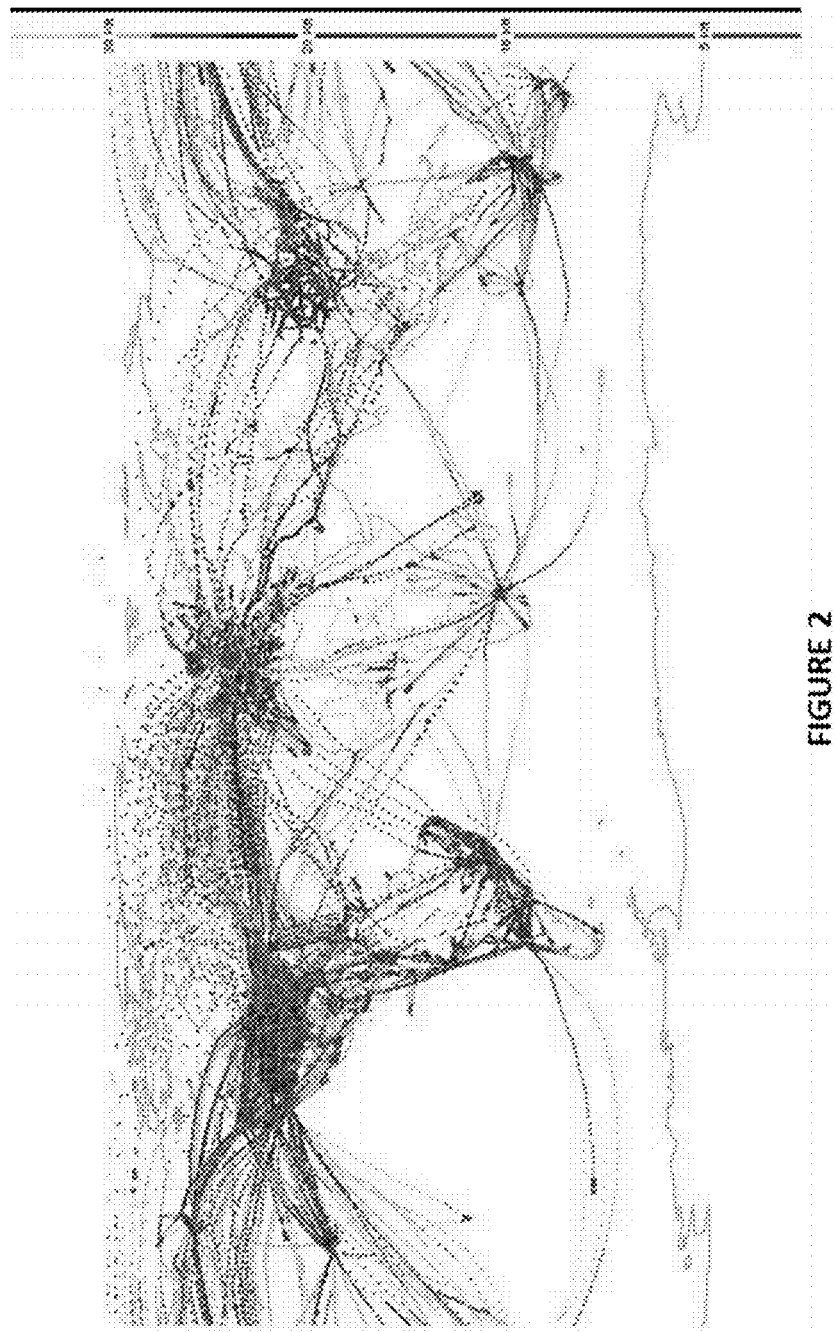

The invention will now be further described, by way of example only, with reference to the accompanying drawings in which:

FIG. 1 is a schematic representation of a system according to an embodiment of the invention; and FIG. 2 is an illustration of a map showing the scheduled flight paths of a plurality of aircraft participating in the AMDAR programme.

FIG. 1 depicts a system 100 for instructing a plurality of drones 300 in accordance with the invention. The system 100 comprises a first communication module 101 configured to communicate with and receive data from a first data source 10, a second data source 20, and a third data source 30. The system also comprises a second communication module 102 configured to communicate with and receive data from a fleet of drones 300. The system may comprise a server or a plurality of connected servers. Modules of the system may be hosted by the server or plurality of servers.

The first communication module 101 may be part of the same communication module as the second communication module 102.

The first data source is a departure control system 10 and contains a first data set comprising flight path data. The flight path data indicates the scheduled flight paths of a plurality of aircraft over the next 24 hour period.

The second data source is a national weather monitoring organisation (NWMO) 20. The NWMO 20 contains a second data set indicating attributes and the geographical location of a plurality of weather monitoring resources. These weather monitoring resources may be fixed weather monitoring resources and/or weather balloons.

The third data source is a drone database 30 containing information related to the fleet of drones 300. The information in the drone database 30 includes the location of each drone in the fleet of drones 300, as well as data relating to attributes of each drone, such as the fuel capacity and/or time in air capacity of each drone in the fleet 300. The information in the drone database 30 also includes information on the type of sensors carried by each drone in the fleet 300.

The system 100 of FIG. 1 is configured to analyse the data from each of the first, second and third data sources 10, 20, 30 and based on this analysis instruct one or more of 35 the drones in the fleet 300 to fly itself to a certain geographical location. To achieve this, the system comprises an analysing module 103, an identifying module 104 and an instructing module 105. These modules may together form a rules based engine 110, which enables the system 100 to decide on the positioning of the one or more drones.

The server may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The chosen geographical location is one in which it would be beneficial for the drone to collect weather data in. Several example implementations of the system 100 of FIG. 1 will now be described. For simplicity, the first, second and third data sources 10, 20, 30 will be described as separate entities from the system 100. However, it will be appreciated that for each example, each of the first, second and third data sources 10, 20, 30 may instead be part of and incorporated into the system 100 of FIG. 1. A first implementation of the system 100 of FIG. 1 concerns sending one or more weather drones 300 to a region where no weather data is expected to be collected by an AMDAR aircraft or NWMO 20. In the first implementation of the system 100 of FIG. 1, the system begins by analysing the expected flight paths of a plurality of flights for an upcoming 24 hours. Such flight paths may be those illustrated by the map of FIG. 2. The system 100 then filters the overall pool of flight paths such that the system is only the flight paths of those aircraft who are equipped with weather measuring sensors, and for example are participating in the AMDAR programme. The system then determines what geographical regions are not intercepted by or adjacent to the filtered flight paths. In this implementation, adjacent to refers to any region which is within 5 kilometres of a given flight path. The system then assess whether there are any fixed weather monitoring resources of the NWMO 20 in or adjacent to the previously determined geographical regions. If the system confirms that there are such fixed resources, then the system 100 is configured to filter out regions where this applies, so that these are no longer being considered as regions for sending the drones to. That is, the system identifies the geographical regions which are both: not intercepted by or adjacent to, any of the flight paths of the AM DAR aircrafts; and not associated with the weather monitoring resources. The system maintains these identified regions as potential candidates for sending a drone to. The system 100 then analysis a set of historical weather data to determine whether any of these geographical regions have a history of extreme weather and identifies any regions which fulfil this criteria, to provide a further reduced set of geographical regions. Finally, once such a reduced set of geographical regions have been identified, the system analyses the third data set to determine whether there are any drones in the fleet 300, which are in a suitable location, and which have the fuel capacity and/or time in air capacity to fly to one of the identified geographical regions. Once such a drone(s) has been identified, the system is configured to instruct the drone(s) to fly to said geographical region and measure weather data in said geographical region using the second communications module 102. The system then receives weather data back from the drone(s) via the second communications module 102. The system then relays the weather data from the drone(s) to the second data source so that the weather data from the drone(s) can be processed and analysed by the NWMO 20. As part of this step, the system 100 uses a data processing engine 106 to convert and/or reformat the weather data so that the weather data is in a form, which is compatible with the system of the NWMO 20. It will be appreciated that the system 100 may send a first drone to a first geographical region and a second drone to a second geographical region. Alternatively or additionally, the system may send two or more drones to the same geographical region.

A second implementation of the system of FIG. 1 concerns sending a weather drone to a region where an AM DAR aircraft was due to collect weather data but no longer will be. In the second implementation of the system 100 of FIG. 1, the system may have already performed the steps of the first implementation discussed above. In any event, in the second implementation, the system 100 is configured to receive an update from the first data source indicating that a change has occurred in one of the flight paths of the first data set. The system then determine the extent of the change, and compare this with a pre-defined threshold value. If the extent of the change is less than the pre-defined threshold value, then the system simply waits for any further updates of changes to the flight paths. If the extent of the change exceeds the pre-defined threshold value, then the system proceeds to the further analysis steps discussed below. In this implementation, the pre-defined threshold value may correspond to a distance of 5 kilometres as measured by comparing points on the previous flight path with corresponding points on the new portion of the changed flight path. The system then assess whether there are any fixed weather monitoring resources of the NWMO 20 in or adjacent to the geographical region(s) where the change in the flight path is occurring. If the system confirms that there are such fixed resources in such region(s), then the system 100 simply waits for further updates of changes to the flight paths. If the system confirms that there are no such fixed resources in such region(s), then the system 100 may analyse further data sources to assess where there is any particular reason why it may be beneficial to obtain weather data in this region. This may include analysing a set of historical weather data to determine whether this region has any history of extreme weather. If the system does not identify any such reason, then the system 100 simply waits for further updates of changes to the flight paths. If the system does identify such a reason, then the system analyses the third data set to determine whether there are any drones in the fleet 300, which are located in a position and have the fuel capacity and/or time in air capacity to fly to one of the identified geographical regions. Once such a drone(s) has been identified, the system is configured to instruct the drone(s) to fly to said geographical region and measure weather data in said geographical region using the second communications module 102. The system may then receive weather data back from the drone(s) via the second communications module 102. The system may then relay the weather data from the drone(s) to the second data source so that the weather data may be processed and analysed by the NWMO 20. As part of this step, the system 100 may use a data processing engine 106 to convert and/or reformat the weather data so that the weather data is in a form, which is compatible with the system of the NWMO 20. It will be appreciated that the system 100 may send a first drone to a first geographical region and a second drone to a second geographical region. Alternatively or additionally, the system may send two or more drones to the same geographical region.

A third implementation of the system of FIG. 1 concerns cancelling the sending of a weather drone to a region because it has now been determined that an AMDAR aircraft will be flying to or close to said region. In the third implementation of the system 100 of FIG. 1, the system may have already performed the steps of the first implementation discussed above. In any event, in the third implementation, the system 100 is configured to receive an update from the first data source indicating that a change has occurred in one of the flight paths of the first data set. The system then determines the extent of the change, and compares this with a pre-defined threshold value. If the extent of the change is less than the pre-defined threshold value, then the system simply waits for any further updates of changes to the flight paths. If the extent of the change exceeds the pre-defined threshold value, then the system proceeds to the further analysis steps discussed below. In this implementation, the pre-defined threshold value may correspond to a distance of 5 kilometres as measured by comparing points on the previous flight path with corresponding points on the new portion of the changed flight path. The system then assess whether there are any weather drones in the fleet 300, which are currently at or on route to the new portion of the changed flight path. That is, the system determines whether the change in flight path means that the aircraft will now be flying over or adjacent to a geographical region where a weather drone is currently flying in or on route to. If the system confirms that there is a weather drone currently at or on route to this geographical region, then the system sends an instruction to said drone, instructing the drone to leave the geographical region or instructing the drone to cancel its current flight to the geographical region. If the drone is already in the geographical region, the system's instructions may include a delay factor, to instruct the drone that it should not leave the geographical region immediately, but should instead leave the geographical region at a specified future time. In this way, the drone may continue collecting weather data in the geographical region, until the AMDAR aircraft has reached or is close to reaching the geographical region.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

The invention claimed is:

1. A computer implemented method of instructing one or more weather drones, the method comprising the steps of:
    analysing a first data set comprising flight path data indicative of flight paths of one or more aircraft over a predefined time period;
    monitoring for updates to the flight path data;
    determining that a change has occurred in the flight path data, wherein one of the flight paths no longer passes through a given geographical region;
    determining that an extent of the change exceeds a threshold value; and
    in response to the extent of the change in the flight path data exceeding the threshold value, sending an instruction to the one or more weather drones, the instruction instructing the one or more weather drones to fly to the given geographical region and instructing the one or more weather drones to collect weather data in the given geographical region.

2. The computer implemented method according to claim 1, further comprising establishing a communications link with the one or more weather drones and sending an instruction command to the one or more weather drones via the communications link.

3. The computer implemented method according to claim 1, further comprising receiving weather data from the one or more weather drones, once the one or more weather drones have arrived at the geographical region.

4. The computer implemented method according to claim 1, further comprising establishing a communication link with one or more of a departure control system and an air traffic control system, and receiving the first data set from one or both of the departure control system and the air traffic control system.

5. The computer implemented method according to claim 1, wherein the first data set comprises flight path data indicative of the flight paths of the one or more aircrafts over a predefined time period.

6. The computer implemented method according to claim 1, wherein the first data set comprises data indicative of the time of year of the flight paths of the one or aircrafts.

7. The computer implemented method according to claim 1, wherein the first data set comprises data indicative of the type of aircraft taking each flight path and the type of sensors carried by the aircraft taking each flight path.

8. The computer implemented method according to claim 1, further comprising analysing drone data comprising data indicating a location of two or more weather drones, and based on said analysis, determining which of the two or more weather drones to instruct to fly to the at least one geographical region.

9. The computer implemented method according to claim 1, wherein the at least one geographical region is a three dimensional region, defined by longitude, latitude and altitude parameters.

10. A computer program product stored on a computer usable medium, comprising computer-readable program means for causing a server to implement the method according to claim 1.

11. The computer implemented method according to claim 1, wherein the instructing of one or more weather drones to fly to the given geographical region comprises instructing a first weather drone to fly to a first given geographical region, and wherein the method further comprises:
    monitoring for further updates to the flight path data and determining that a change has occurred in the flight path data, wherein one of the flight paths now passes through or adjacent to the first given geographical region; and
    instructing the first weather drone to no longer fly to the first given geographical region.

12. A computer system for instructing one or more weather drones, the system comprising:
    an analysing module configured to analyse at least a first set of data, said data comprising flight path data indicative of flight paths of one or more aircrafts within a predefined time period;
    a monitoring module configured to monitor for updates to the flight path data; and
    a determining module configured to determine that a change has occurred in the flight path data, wherein one of the flight paths no longer passes through a given geographical region, and configured to determine that the extent of the change exceeds a threshold value; and
    an instructing module configured to, in response to the change in the flight path data exceeding the threshold value, send an instruction to the one or more weather drones, the instruction instructing the one or more weather drones to fly to the given geographical region and instructing the one or more weather drones to collect weather data in the given geographical region.

* * * * *